May 15, 1951  N. L. MENEGAY  2,552,639
HOLDER FOR FISHING RODS
Filed March 16, 1950
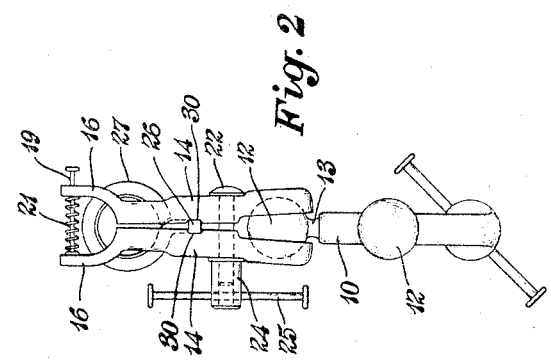
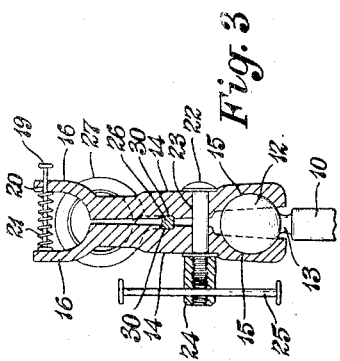
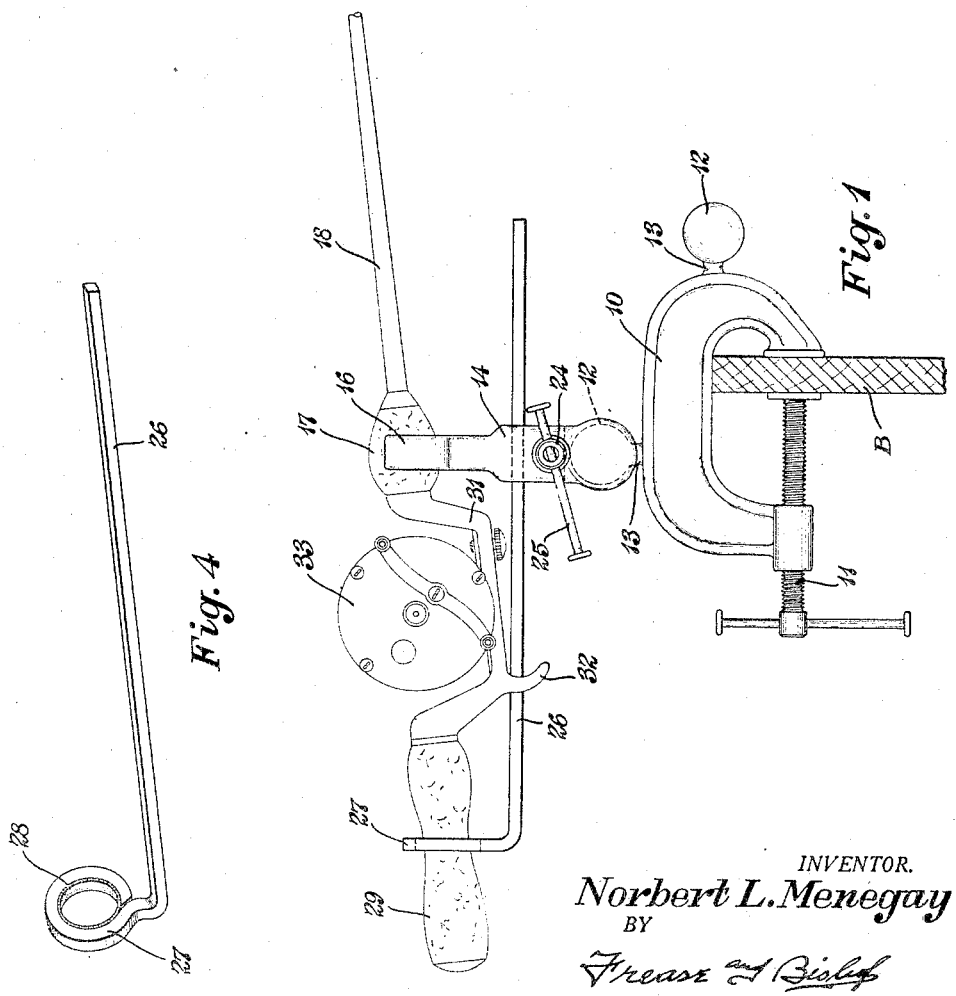
INVENTOR.
Norbert L. Menegay
BY
Frease and Bishop
ATTORNEYS Patented May 15, 1951

2,552,639

UNITED STATES PATENT OFFICE 2,552,639

HOLDER FOR FISHING RODS

Norbert L. Menegay, Louisville, Ohio

Application March 16, 1950, Serial No. 149,986

2 Claims. (Cl. 248—42)

The invention relates to holders for fishing rods or poles, and more particularly to such a device adapted to be clamped to the side or seat of a boat, or other suitable support, for holding a fishing rod or pole in any desired adjusted position.

An object of the invention is to provide a holder for fishing rods which may be readily adjusted to hold the rod at any desired angle to the horizontal and in any location around a vertical axis.

Another object is to provide such a holder which is quickly and easily adapted for connection to either a vertical or horizontal supporting surface as desired.

A further object is to provide a holder of the character referred to in which adjustments around both vertical and horizontal axes may be made by a single clamping device.

A still further object is to provide such a holder comprising a support member for attachment to a suitable supporting surface and having a ball therein, a pair of similar clamping members each having a half-round socket therein for receiving said ball and cooperating to form a saddle for an intermediate portion of the handle of a fishing rod, a bar slidably located between said clamping members and having a ring thereon for receiving the end of the fishing rod handle, and a single clamping screw for locking the clamping members in adjusted position upon the ball and simultaneously clamping the bar in adjusted position.

The above objects together with others which will be apparent from the drawing and following description, or which may be later referred to, may be attained by constructing the improved fishing rod holder in the manner hereinafter described in detail and illustrated in the accompanying drawing, in which;

Figure 1 is a side elevation of a fishing rod holder embodying the invention;

Fig. 2 a front elevation of the same;

Fig. 3 a transverse, sectional view through the holder; and

Fig. 4 a detached, perspective view of the rod which supports the end of the fishing rod handle.

Referring now more particularly to the construction illustrated in the drawing, in which similar numerals refer to similar parts throughout, the embodiment of the invention illustrated comprises a C-clamp 10, with usual clamping screw 11, adapted to be clamped upon the side of a boat, or other vertical supporting means, as indicated at B in Fig. 1, or upon the seat of a boat, or other horizontal supporting means, as will be later described.

A ball 12 is connected to one side of the C-clamp 10 as by a short neck 13, and for a purpose to be later described, a similar ball 12 is connected to one end of the C-clamp by a similar neck 13. These balls may be integrally formed upon the C-clamp or rigidly attached thereto.

The holder includes a pair of clamping members 14—14 having opposed semi-spherical sockets 15 formed in their lower end portions. The upper end of each clamping member 14 has an outwardly and upwardly curved finger 16 formed thereon, whereby when the two members 14 are clamped together, as shown in the drawing, the two fingers 16 form a substantially half-round or U-shaped seat for an intermediate portion 17 of the handle of the fishing rod 18.

In order to retain a cane fishing pole in this seat, a spring loaded pin 19 may be slidably located through a suitable aperture 20 in one of the fingers 16, the spring 21 being adapted to normally hold this pin in the position shown in Figs. 2 and 3, over the top of a cane pole located in the seat.

A screw 22 is transversely located through suitable apertures 23 in the clamping members 14—14 and a clamping nut 24 is mounted upon the outer end of this screw and adapted to be quickly and easily operated as by the crank handle 25.

With this arrangement the nut 24 may be loosened upon the screw sufficiently to permit the clamping members 14—14 to be moved to any desired adjusted position upon the ball 12, after which the nut is tightened, holding the members 14—14 tightly clamped in adjusted position upon the ball.

This permits any desired adjustment of the clamping members 14—14 relative to the ball, whereby they may be rotated around a vertical axis, or tilted either forward or backward around a horizontal axis, and then clamped in adjusted position.

For the purpose of supporting the outer end of the fishing rod or pole, a rod 26 is provided, which is preferably square in cross section as shown in the drawing, and provided at its outer end with a ring or loop 27, preferably having a rubber lining 28 therein so as not to scratch or damage the usual cork handle 29 ordinarily provided upon the conventional fishing rod.

The rod 26 is adjustably connected to the holder so as to accommodate various types and design of fishing rods, and for the purpose of providing a single adjustment for all of the movable parts of the holder, this rod 26 is adapted to be clamped between the clamping members 14—14 and is slidably located through the opposed notches 30 therein.

With this construction, when the nut 24 is loosened to make the desired adjustment, the rod 26 is slidably moved between the clamping members 14—14 to the desired position, the clamping members 14—14 are properly positioned relative to the ball 12 and the nut 24 is tightened, simultaneously clamping the members 14—14 and the rod 26 in the desired adjusted position.

The improved holder is arranged to be so adjusted that when a fishing rod is placed therein, as shown in Fig. 1, the offset reel holding portion 31 of the handle may be received against the rod 26, the finger grip 32 thereon resting against one side of said rod and holding the reel 33 in position that it may be easily operated.

When it is desired to attach the holder to the seat of a boat, or other horizontal support, the clamping nut is released sufficiently to permit the clamping members 14—14 to be disengaged from the ball 12 upon the side of the C-clamp, and to be engaged with the ball 12 upon the end thereof.

For this purpose the C-clamp is mounted upon the horizontal support with this endmost ball upward and the clamping members 14—14 are clamped to the uppermost ball 12 in the manner above described.

From the above it will be obvious that a simple and easily adjusted fishing rod holder is provided which by means of a single adjusting screw and nut may be clamped in any desired position so as to hold the fishing rod at any desired angle to the horizontal and in any location around a vertical axis, the rod being so positioned in the holder that the reel may be operated without removing the rod from the holder.

I claim:

1. A fishing rod holder comprising a support member, a ball rigidly mounted upon the support member, a pair of similar clamping members having opposed sockets in their lower ends for adjustably receiving the ball, means for clamping said clamping members in adjusted position upon the ball, means at the upper ends of the clamping members forming a rest for a fishing rod, a rod carried by the clamping members and located substantially perpendicular thereto and an eye upon the rod for receiving the end of a fishing rod.

2. A fishing rod holder comprising a support member, a ball rigidly mounted upon the support member, a pair of similar clamping members having opposed sockets in their lower ends for adjustably receiving the ball, means for clamping said clamping members in adjusted position upon the ball, outwardly and upwardly curved fingers at the upper ends of the clamping members forming a rest for a fishing rod, a rod carried by the clamping members and located substantially perpendicular thereto and an eye upon the rod for receiving the end of a fishing rod.

NORBERT L. MENEGAY.

REFERENCES CITED

The following references are of record in the file of this patent:

UNITED STATES PATENTS

| Number | Name | Date |
|---|---|---|
| 596,729 | White | Jan. 4, 1898 |
| 1,227,258 | Godley | May 22, 1917 |
| 1,661,207 | Weaver | Mar. 6, 1928 |